US012557791B2

(12) United States Patent
Scheele

(10) Patent No.: US 12,557,791 B2
(45) Date of Patent: Feb. 24, 2026

(54) REARING-KEEPING FACILITY FOR REARING POULTRY ANIMALS, CORRESPONDING POULTRY ANIMAL HOUSE AND USE

(71) Applicant: BIG DUTCHMAN INTERNATIONAL GMBH, Vechta (DE)

(72) Inventor: Henry Scheele, Langförden (DE)

(73) Assignee: BIG DUTCHMAN INTERNATIONAL GMBH, Vechta (DE)

( * ) Notice: Subject to any disclaimer, the term of this patent is extended or adjusted under 35 U.S.C. 154(b) by 1 day.

(21) Appl. No.: 18/887,563

(22) Filed: Sep. 17, 2024

(65) Prior Publication Data

US 2025/0089686 A1     Mar. 20, 2025

(30) Foreign Application Priority Data

Sep. 20, 2023    (LU) ........................................ 505136

(51) Int. Cl.
*A01K 31/10*        (2006.01)
*A01K 31/19*        (2006.01)

(52) U.S. Cl.
CPC .................................... *A01K 31/19* (2013.01)

(58) Field of Classification Search
CPC ........ A01K 31/19; A01K 31/22; A01K 31/18; A01K 31/10; A01K 31/02; A01K 1/0017; A01K 31/17; A01K 31/005; A01K 1/08
See application file for complete search history.

(56) References Cited

U.S. PATENT DOCUMENTS

| | | | | |
|---|---|---|---|---|
| 3,389,687 A | * | 6/1968 | Trussell ............... | A01K 31/005 |
| | | | | 119/448 |
| 3,690,301 A | * | 9/1972 | Bruggeman ......... | A01K 31/005 |
| | | | | 119/456 |
| 4,020,793 A | | 5/1977 | Morrison | |
| 4,905,628 A | * | 3/1990 | Williams ............... | A01K 31/17 |
| | | | | 119/478 |

FOREIGN PATENT DOCUMENTS

| | | | | |
|---|---|---|---|---|
| CN | 112704029 A | * | 4/2021 | ............. A01K 31/02 |
| DE | 102011087012 | | 5/2013 | |
| DE | 102011057174 A1 | * | 7/2013 | ............. A01K 31/10 |
| DE | 202014103037 U1 | * | 7/2014 | .......... A01K 31/005 |
| EP | 1813147 | | 8/2007 | |
| WO | WO-2020161315 A1 | * | 8/2020 | ............. A01K 31/22 |

* cited by examiner

*Primary Examiner* — Monica L Perry
(74) *Attorney, Agent, or Firm* — PRICE HENEVELD LLP

(57) ABSTRACT

A rearing-keeping facility for the staggered rearing of poultry animals, in particular rearing aviary, is disclosed and includes at least one first rearing plane and a second rearing plane arranged above the first rearing plane. The rearing planes are configured for keeping the poultry animals, and the first rearing plane has a first lateral opening towards at least one side of the rearing-keeping facility and the second rearing plane has a second lateral opening towards the one side. A door arrangement is provided for closing the openings. The door arrangement has a closure arranged in a vertically displaceable manner with respect to the two openings and configured for releasing or for closing the first opening, the second opening, and both openings.

20 Claims, 7 Drawing Sheets

REARING-KEEPING FACILITY FOR REARING POULTRY ANIMALS, CORRESPONDING POULTRY ANIMAL HOUSE AND USE

CROSS-REFERENCE TO FOREIGN PRIORITY APPLICATION

The present application claims the benefit under 35 U.S.C. §§ 119(b), 119(e), 120, and/or 365(c) of Luxembourg Application No. LU505136 filed Sep. 20, 2023.

FIELD OF THE INVENTION

The invention relates to a rearing-keeping facility for the staggered rearing of poultry animals, in particular a rearing aviary, with at least one first rearing plane and a second rearing plane, which is arranged above the first rearing plane, wherein the rearing planes are configured for keeping the poultry animals, and wherein the first rearing plane has a first lateral opening towards at least one side of the rearing-keeping facility and the second rearing plane has a second lateral opening towards the side, and a door arrangement for closing the openings.

BACKGROUND OF THE INVENTION

Rearing-keeping devices of this type are known from the prior art. They are used for the so-called staggered rearing of poultry animals. This means that, depending on the growth stage, the poultry animals are kept on the individual rearing planes or that lateral openings of the rearing planes are released by opening closing means, so that the animals can leave the keeping facility and can change between the individual rearing planes or also towards a floor below the keeping facility. To close the lateral openings of the rearing planes, it is known to use foldable gratings, collapsible gratings, or also slidable gratings as closing means, which are provided separately for the individual rearing planes and which are configured for closing the respective lateral openings.

Even if these solutions have proven themselves in general, there is nonetheless room for improvements. Separate closing means, which increase the mechanical complexity of the keeping facility, are thus typically provided for opening and releasing the lateral openings for each rearing plane. The operator furthermore has to often open or close a plurality of closing means, which is associated with quite a significant operating effort. Aside from this, there is the challenge to stow removed closing means when they are not in use. In the case of keeping facilities, which have displaceable closing means, they often at least partly block an access to the poultry animals.

In light of the foregoing, the invention was based on the object of further developing a rearing-keeping facility of the above-identified type in such a way that the disadvantages found in the prior art are eliminated as far as possible. In particular, a rearing-keeping facility was to be specified, which has a door arrangement, which can be configured flexibly and has a high operating comfort and which, if possible, does not impact an accessibility of the poultry animals or impacts it only slightly.

SUMMARY OF THE INVENTION

According to the invention, the object is solved in the case of a rearing-keeping facility of the above-mentioned type in that the door arrangement has a closing means, which is arranged in a vertically displaceable manner with respect to the two openings and which is configured for releasing or for closing the first opening, the second opening, and both openings. In a sense, the first opening is thereby a lower opening and the second opening is an upper opening of the rearing-keeping facility.

The invention utilizes the knowledge that the lateral openings of both rearing planes can be flexibly opened and closed by means of the use of a single vertically displaceable closing means in the form of a door or of a gate, respectively. For example, a positioning of the closing means in such a way that both openings are released, makes it possible that vaccinating personnel can remove the animals more easily from the plant when catching and vaccinating them. Due to the fact that the closing means is removed completely from the region of the two openings towards the rearing planes, no barriers are created for the personnel and the personnel can place itself partly or completely into the keeping facility, if needed. In one operating scenario, in which only the second, upper opening is closed by means of the closing means, it is ensured that the young animals can only jump down from the upper rearing plane onto a floor below the keeping facility and possibly injure themselves thereby. On the other hand, it is simplified for the personnel to initially remove poultry animals from the lower rearing plane, whereby the animals are kept safely in the upper rearing plane. If the closing means is positioned in such a way that both openings are closed, it can be ensured that the poultry animals cannot reach onto the floor below the keeping facility, in particular in the initial phase of the rearing process. To that extent, the demands to be made on a staged rearing can be addressed for the operating personnel in a particularly flexible manner by means of a single closing means. Compared to solutions, which are known from the prior art, in the case of which foldable gratings or collapsible gratings are used, the accessibility of the keeping facility as a whole is increased significantly. This is in particular due to the fact that the closing means can preferably be displaced completely from the region of the lateral openings.

According to one embodiment, the door arrangement has a guide arrangement for guiding the closing means, wherein the guide arrangement is arranged on a base frame of the keeping facility. By means of the guide arrangement, it is ensured in a safe way that the closing means can be displaced relative to the openings. A particularly space-saving design of the guide arrangement is furthermore attained by means of the arrangement on the base frame.

According to one embodiment, the guide arrangement has oppositely arranged guide rails, on which the closing means is guided in a displaceable manner, and wherein adjacent to the lateral openings, the guide rails have an essentially vertical guide rail section, which is configured for guiding the closing means for closing and releasing the lateral opening. The guidance of the closing means by means of guide rails provides for a safe guidance of the guide means, whereby the guide means can be displaced in a simple way by the operator and whereby it is ensured that the poultry animals are kept in the respective rearing plane when the lateral openings are closed.

According to one embodiment, the guide rails have, on the top side of the base frame, an essentially horizontal guide rail section, which is in particular dimensioned in such a way that the closing means can be received completely in the horizontal guide rail section. The horizontal guide rail section arranged on the top side in the base frame makes it possible to move the closing means into a rest position, in which the closing means is arranged in such a way that it does not limit the accessibility of the holding facility or only limits it slightly, in particular when the lateral openings are to be released completely.

The closing means can be displaced from the essentially vertical guide rail section to the essentially horizontal guide rail section and vice versa.

According to one embodiment, the guide rails, between the essentially vertical guide rail section and the essentially horizontal guide rail section, have a curved guide rail section, which connects the vertical guide rail section to the horizontal guide rail section. In this way, the closing element can advantageously be transferred from the horizontal guide rail section into the vertical guide rail section and vice versa. By providing the curved guide rail section, the closing means can be transferred between the operating positions more easily and with higher operating comfort.

According to one embodiment, the closing means is formed as grating. The use of a grating has especially proven itself in order to safely keep the poultry animals in the respective rearing planes on the one hand, and to simultaneously ensure a visibility into the rearing planes, as well as a ventilation thereof. According to one embodiment, the grating is coated, in particular with zinc-aluminum. The corrosion protection is improved thereby and the service life of the grating is thus increased.

According to one embodiment, the grating is formed from at least two grating segments, wherein the at least two grating segments are connected by means of a connecting means and can in particular be moved relative to one another, in particular pivoted. In a sense, the grating is thus formed in the form of a sectional door. According to one embodiment, the connecting means are configured for reversibly connecting the grating segments, in particular by means of a latching mechanism, and for releasing a connection between the grating segments. By means of the movability or pivotability, respectively, it is ensured that the grating can follow the course of the guide rails.

The individual grating segments or also groups of grating segments can be separated easily in this way. In a sense, the grating segments can thereby form grating sections, wherein, for example, a first grating section, formed from several grating segments, can be used to close the lateral opening of the lower rearing plane, and a second grating section, which likewise preferably consists of several grating segments, can, for example, be transferred into the horizontal guide section, so that grating sections, which are not required in this configuration, can be stowed in this position. At the start of the rearing phase, it can be attained thereby that the young poultry animals cannot escape from the first rearing plane and the personnel can nonetheless quickly obtain access to the animals through the released lateral opening. The personnel can easily bring together the grating segments to form a composite structure and separate them from one another by means of the latching mechanism.

According to one embodiment, at least two laterally opposite guide means by means of which the grating segment is guided on the opposite guide rails, are assigned to each grating segment. The guide means in particular have pins, which encompass the guide rails on both sides. With the use of the guide means, the grating segments are safely guided on the guide rails. The guide means are furthermore formed in such a way that they can also be guided in a simple way along the curved guide rail section, so that the grating as a whole can be moved from the vertical guide rail section into the horizontal guide rail section and vice versa, as well as within the respective guide rail sections.

According to one embodiment, the connecting means for two adjacent grating segments are formed on the guide means. In a sense, the guide means thus has two functions: on the one hand, it serves the purpose of guiding the grating segments relative to the guide rails and furthermore also of establishing a reversible connection to an adjacent grating segment. The total number of animals can be reduced by means of the functional integration.

According to one embodiment, a stop, which delimits a movement range of the grating in the vertical guide rail section and/or the horizontal guide rail section, is assigned to the guide rails. It can be ensured in this way that the grating does not unintentionally leave the respective guide rail section and is kept securely within the desired movement range.

According to one embodiment, the rearing planes each have a lateral opening towards at least a second side, wherein the keeping facility has a second door arrangement with a closing means, which is received in a vertically displaceable manner with respect to the two openings and which is configured for releasing or for closing the first, in particular lower, opening, the second, in particular upper, opening and both openings.

According to one embodiment, the second side is arranged opposite the first side. The second door arrangement utilizes the same advantages and preferred embodiments as the first door arrangement. To avoid repetitions, reference is made to the above statements.

By means of the use of a second closing means for the openings of an opposite side of the keeping facility, the latter becomes accessible from both sides. According to one embodiment, the horizontal guide sections of the first door arrangement and of the second door arrangement are arranged spaced apart from one another on the top side of the base frame and one on top of the other. The closing means or gratings, respectively, of the two door arrangements can overlap one another in the upper region of the keeping facility in this way, whereby a particularly space-saving construction is attained.

According to one embodiment, the keeping facility in each case has several lateral openings in the first rearing plane and the second rearing plane, wherein a door arrangement with a closing means is in each case provided for respective adjacent lateral openings of the first rearing plane and of the second rearing plane. For example, two or more door arrangements can be arranged next to one another in this way and furthermore also opposite one another on a keeping facility.

The invention has been described above with reference to a keeping facility. In a further aspect, the invention relates to a method for the configuration of a keeping facility according to at least one of the preceding exemplary embodiments. With regard to the method, the invention solves the above-identified object with the steps of: positioning the grating in such a way that the lateral openings are open, and/or positioning the grating in such a way that the lateral opening of the first rearing plane is closed and the lateral opening of the second rearing plane is open, and/or positioning the grating in such a way that both lateral openings of the first rearing plane and of the second rearing plane are closed, and/or dividing the grating into grating sections and moving the grating sections of the grating in such a way that the lateral opening of the second rearing plane is closed and the lateral opening of the first rearing plane is open.

The method utilizes the same advantages and preferred embodiments as the keeping facility according to the invention and vice versa.

In this respect, reference is made to the above statements and the content thereof is also included here. In summary, a particularly flexible configurability of the keeping facility is made possible, depending on the growth stage of the poultry animals or as a function of work to be performed, respectively, such as, for example, catching or vaccinating.

In a further aspect, the invention relates to a poultry animal house for rearing poultry animals, in particular a pullet house. With regard to the poultry animal house, the invention solves the above-identified object in that said poultry animal house comprises a rearing-keeping facility according to at least one of the preceding exemplary embodiments. The poultry animal house also utilizes the same advantages and preferred embodiments as the keeping facility according to the invention and the method according to the invention and vice versa. In this respect, reference is made to the above statements and the content thereof is also included here.

In a further aspect, the invention relates to the use of a rearing-keeping facility according to at least one of the preceding exemplary embodiments for rearing poultry animals, in particular pullets, in a poultry animal house, preferably in a poultry animal house as described herein. The use also utilizes the same advantages and preferred embodiment as the keeping facility according to the invention, the method according to the invention, the poultry animal house according to the invention and vice versa. With respect to this, reference is made to the above statements and the content thereof is also included here.

BRIEF DESCRIPTION OF THE DRAWINGS

The invention will be described in more detail below on the basis of a preferred exemplary embodiment with reference to the enclosed figures, in which.

DETAILED DESCRIPTION OF THE EMBODIMENTS

Figure 1:
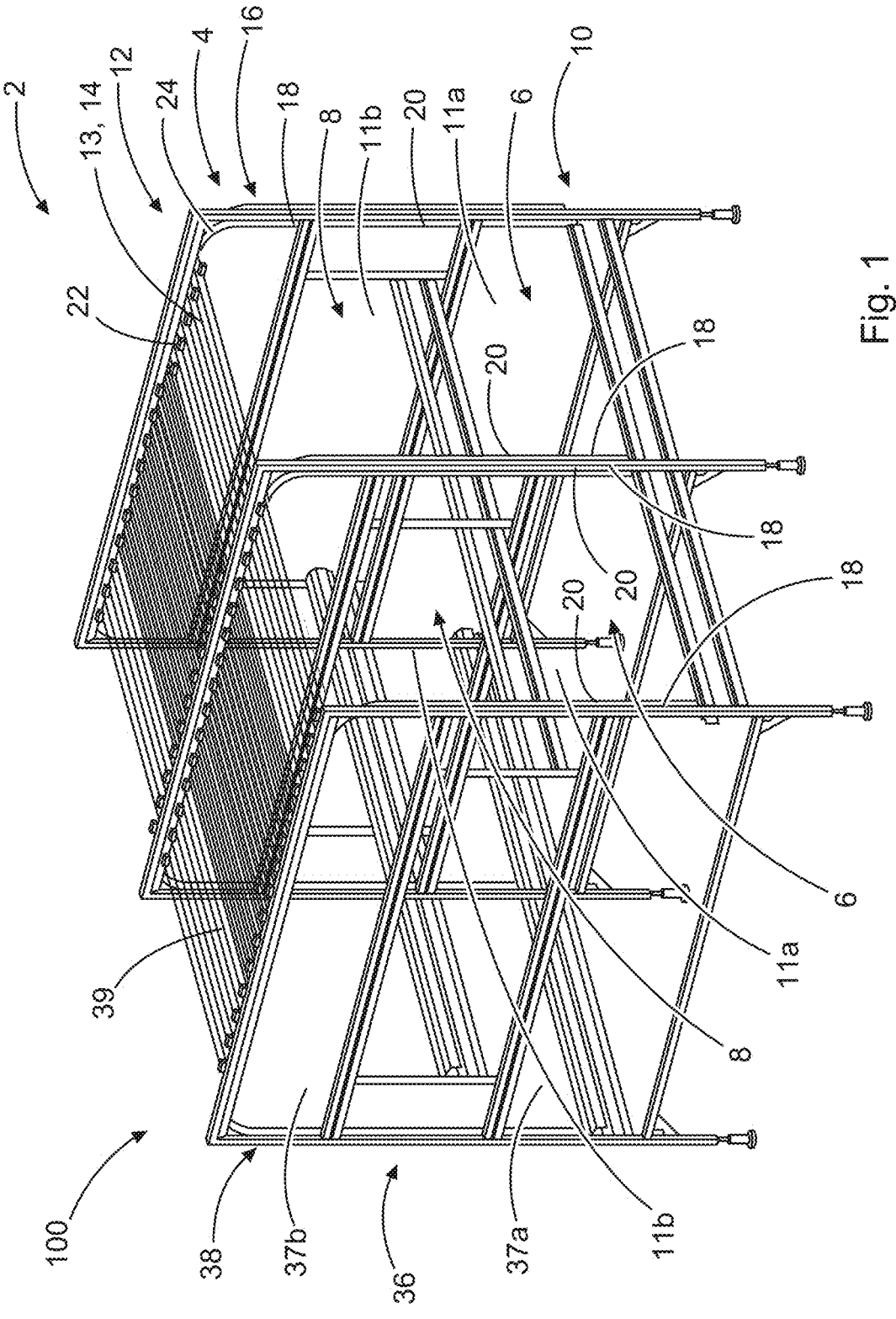
FIG. 1 shows a poultry animal house according to the invention with a rearing-keeping facility, wherein the closing means release the lateral openings.

FIGS. 1-7 show a poultry animal house 100 for rearing poultry animals, which is illustrated schematically in FIG. 1. The poultry animal house 100 is a pullet house. With reference to FIG. 1, the poultry animal house 100 comprises a rearing-keeping facility 2. The rearing-keeping facility 2 serves the purpose of the staged rearing of poultry animals and is formed in particular as rearing aviary 2. The rearing-keeping facility 2 has a base frame 4. A first rearing plane 6 and a second rearing plane 8 is formed or received, respectively, on the base frame 4. The second rearing plane 8 is arranged above the first rearing plane 6. The rearing planes 6, 8 are configured for keeping the poultry animals. The rearing planes 6, 8 are formed to open towards at least one side 10 of the rearing-keeping facility 2 via a lateral opening 11a, 11b in each case. In the exemplary embodiment shown in FIG. 1, each rearing plane 6, 8 has openings 11a, 11b which are arranged adjacent to one another.

The rearing-keeping facility 2 furthermore has a door arrangement 12 with a closing means 13, wherein the closing means 13 is received in a vertically displaceable manner with respect to the two openings 11a, 11b and is configured for simultaneously releasing or for closing the first, lower opening 11a, the second, upper opening 11b, or also both openings 11a, 11b. In the operating state shown in FIG. 1, both openings 11a, 11b are released by means of the closing means 13.

The door arrangement 12 further has a guide arrangement 16 for guiding the closing means 13. The guide arrangement 16 is arranged on the base frame 4 of the keeping facility 2. In FIG. 1 and in the further Figures, the door arrangement is in each case detailed for the lateral openings 11a, 11b, which are illustrated on the right in the Figure.

The guide arrangement 16 has oppositely arranged guide rails 18. The closing means 13 is guided in a displaceable manner on the guide rails 18. Adjacent to the lateral openings 11a, 11b, the guide rails 18 have an essentially vertical guide rail section 20. The essentially vertical guide rail section 20 is configured for guiding the closing means 13 for closing and releasing the lateral openings 11a, 11b. On the top side of the base frame 4, the guide rails 18 further have an essentially horizontal guide rail section 22. The essentially horizontal guide rail section 22 is dimensioned in such a way and is configured for completely receiving the closing means 13 in the horizontal guide rail section 22. This state is illustrated in FIG. 1. It can be seen here that the upper horizontal guide rail section 22 can completely receive the closing means 13, so that the closing means is received horizontally and above the second rearing plane 8.

Between the essentially vertical guide rail section 20 and the essentially horizontal guide rail section 22, the guide rails 18 further have a curved guide rail section 24. The curved guide rail section 24 connects the vertical guide rail section 20 to the horizontal guide rail section 22. The closing means 13 can be moved back and forth between the horizontal guide rail section 22 and the vertical guide rail section 20 in a particularly comfortable way by means of the curved guide rail section 24, which is formed on both opposite guide rails 18.

Figure 7:
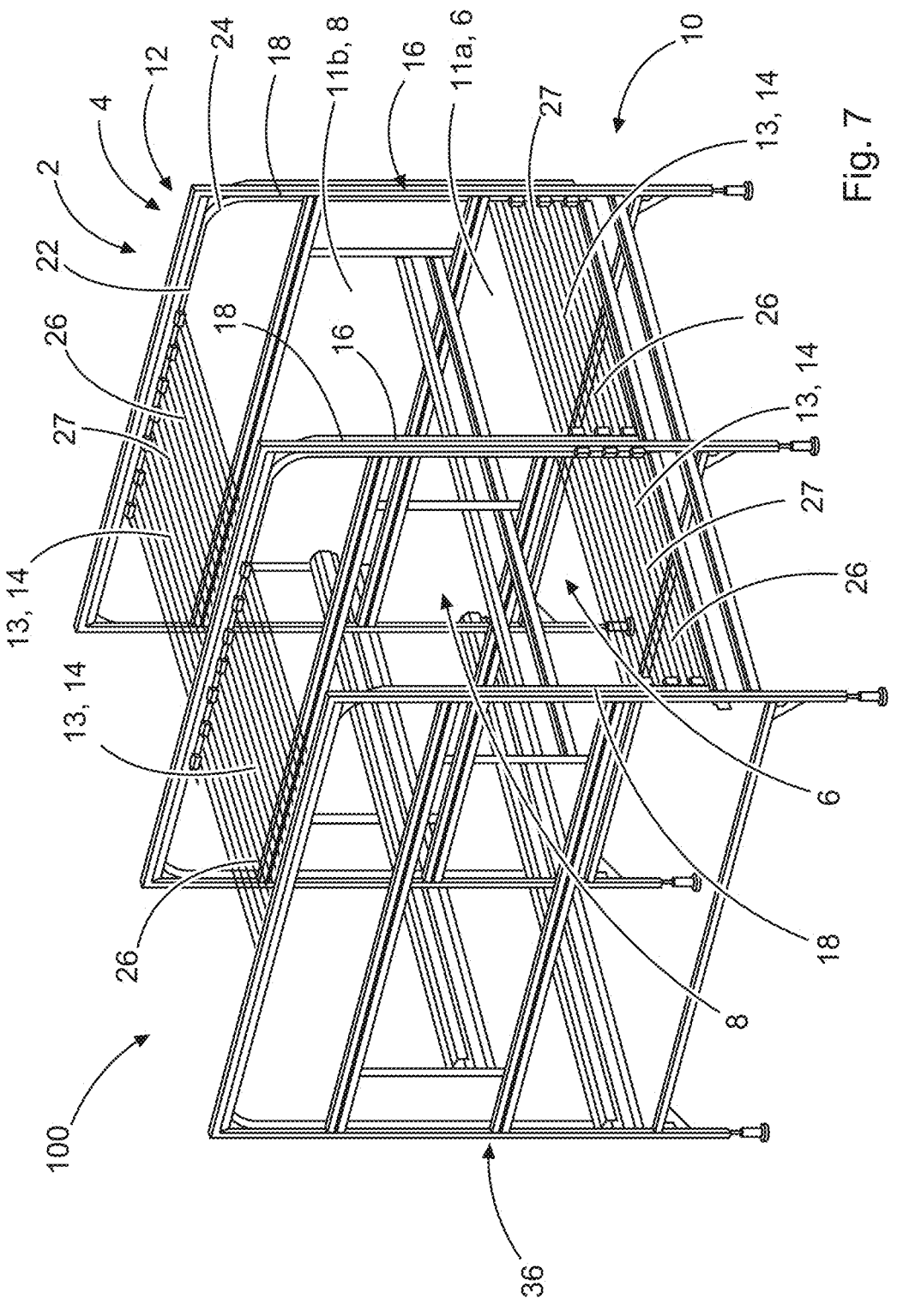
FIG. 7 shows the exemplary embodiment of the rearing-keeping facility according to the invention according to FIG. 1, wherein the closing means are divided and thereby close the first, lower opening and release the second, upper opening.

In the exemplary embodiment shown in the Figure, the closing means 13 is formed as grating 14. The grating 14 consists of several grating segments 26, wherein two grating segments 26 are in each case connected by means of a respective connecting means 28, as can be seen clearly in FIGS. 2 and 4 as well as 5. The connecting means 28 are configured for reversibly connecting the grating segments 26 to one another, in particular by means of a latching mechanism 32 and to reversibly release a connection between the grating segments 26. The grating segments 26 can be joined to form a grating 14 in this way and furthermore also to individual grating sections 27, as shown in FIG. 7.

Figure 4:
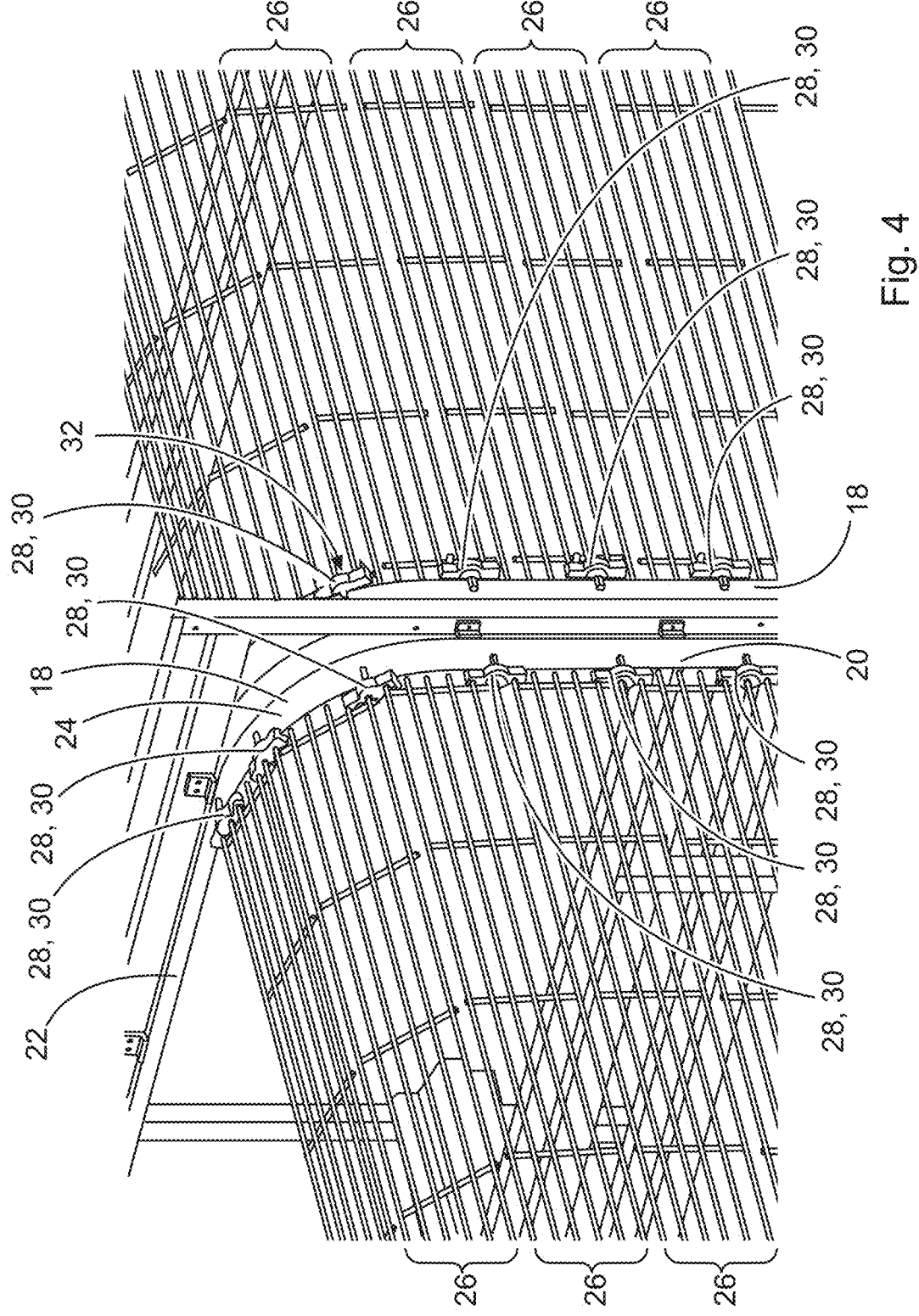
FIGS. 4 and 5 show detail views of the operating state according to FIG. 3.
Figure 5:
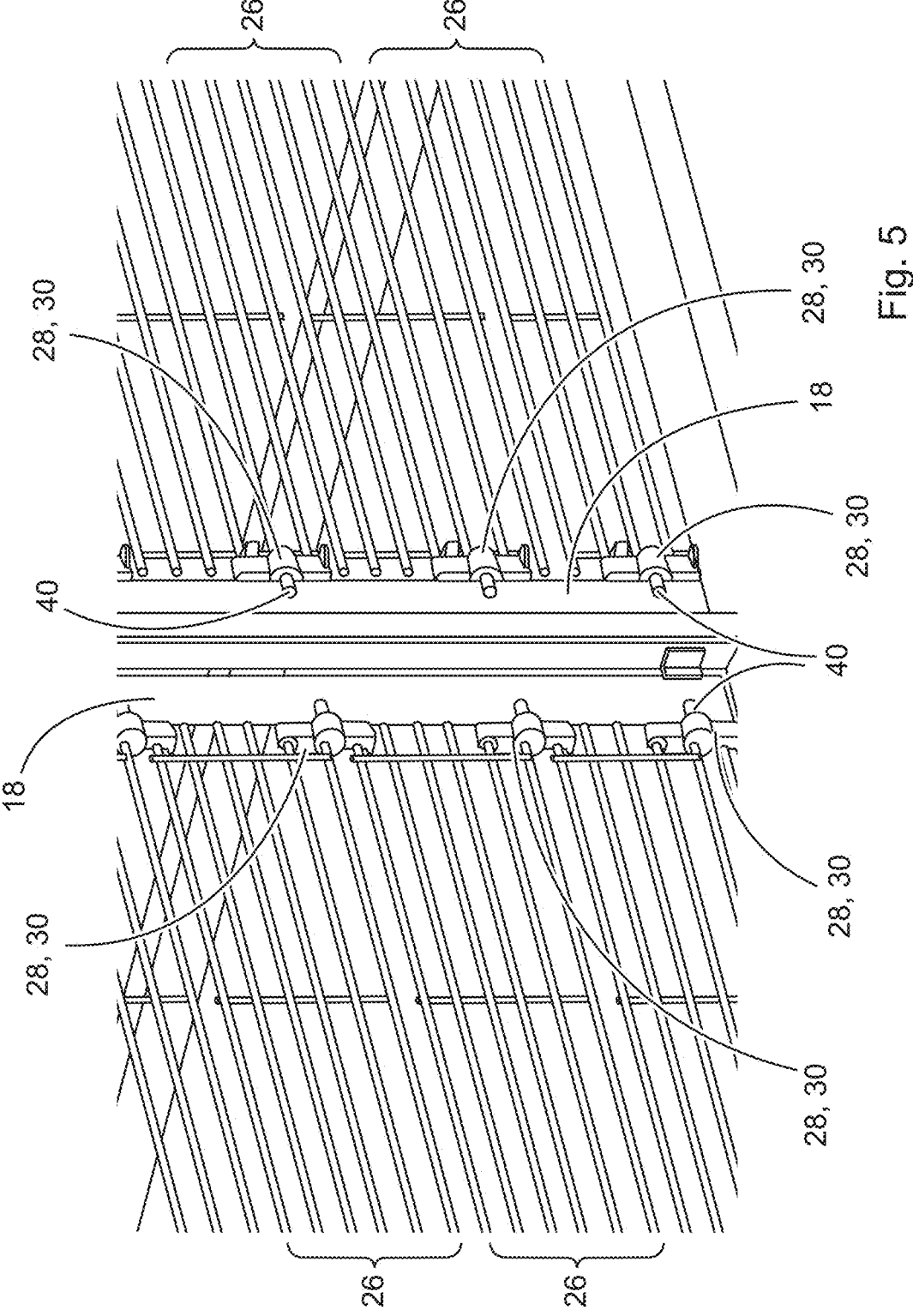
Figure 6:
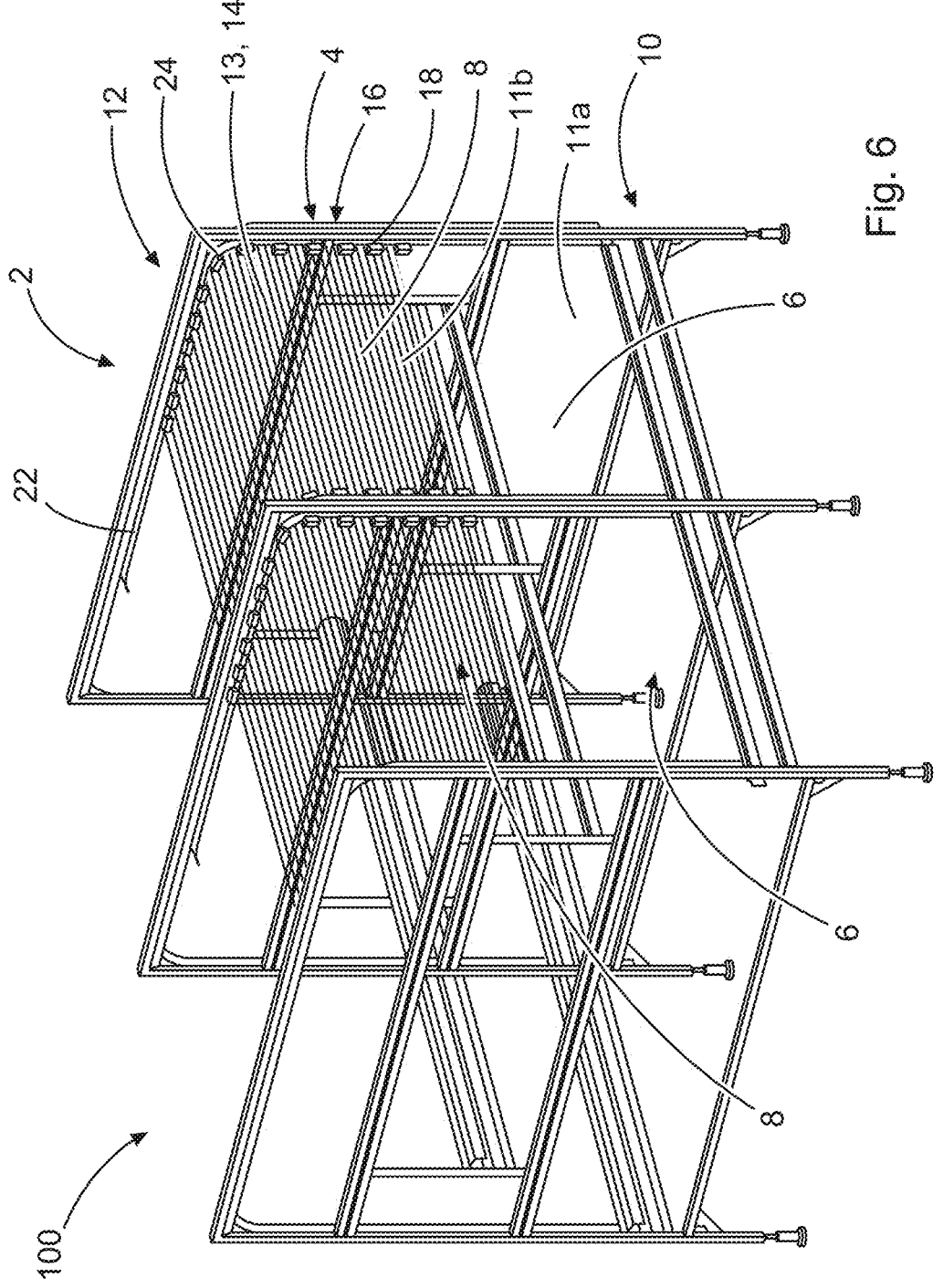
FIG. 6 shows the exemplary embodiment of the rearing-keeping facility according to the invention according to FIG. 1, wherein the closing means close the second, upper opening.

By providing latching mechanisms 32, the grating segments 26 can be connected, as desired by the operator. Two laterally opposite guide means 30 are assigned to each grating segment 26. The respective grating segment 26 is guided in the opposite guide rails 18 by means of the guide means 30. The guide means 30 in particular have two opposite guide pins 40, which are in contact with opposite sides of the guide rails 18, so that the guide means 30 are securely guided on the guide rails 18. In the exemplary embodiment shown in the Figures, the connecting means 28 for two adjacent grating segments 26 are formed on the guide means 30. In a sense, the guide means 30 thus fulfill two functions. On the one hand, they serve for the guidance with respect to the guide rails 18 and, on the other hand, for reversibly connecting adjacent grating segments 26 to one another. The adjacent grating segments 26 are furthermore guided in a relatively pivotable or rotational manner, respectively, within the connecting means 28, so that the grating 14 as a whole can pass the curved guide rail section 24, as shown in FIG. 4, without the composite structure of the grating segments 26 being dissolved thereby.

Figure 2:
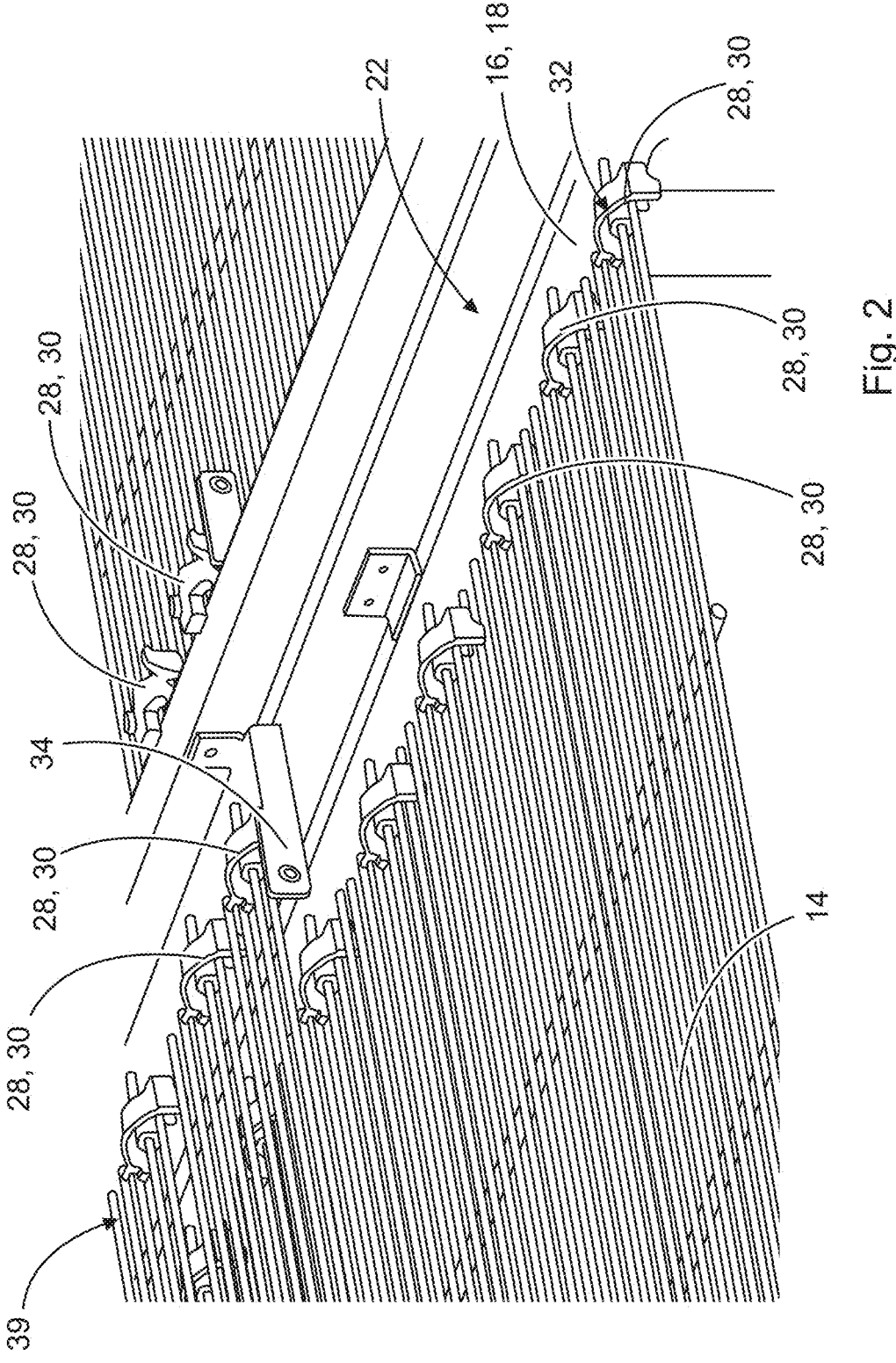
FIG. 2 shows a detail view of a horizontal guide rail section from FIG. 1.
Figure 3:
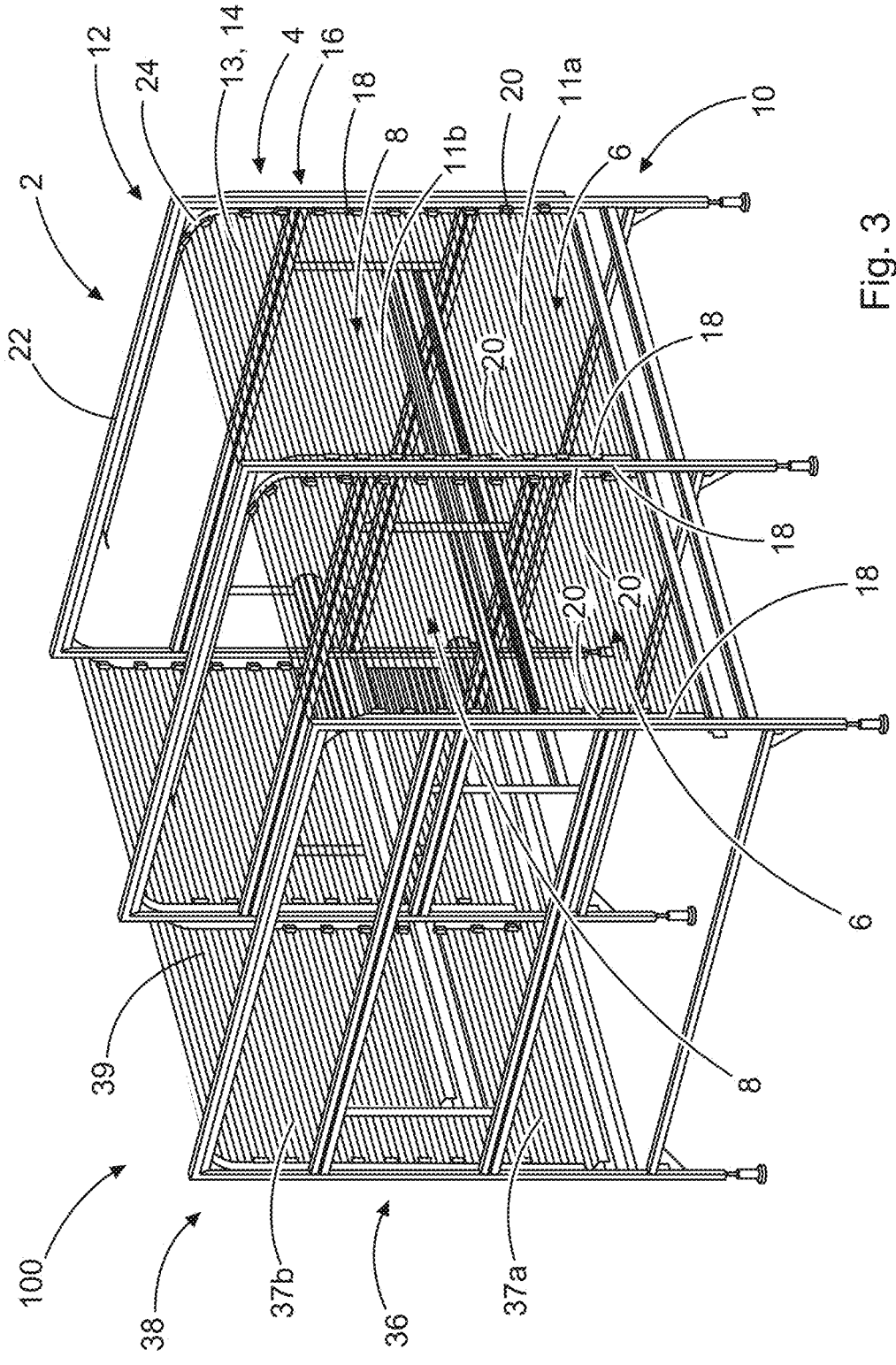
FIG. 3 shows the exemplary embodiment of the rearing-keeping facility according to the invention according to FIG. 1, wherein the closing means close the lateral openings.

As shown in FIG. 2, a stop 34 is assigned to the guide rails 18. The stop 34 delimits a movement range of the grating 14 into the vertical guide rail section 20 and/or the horizontal guide rail section 22. It is ensured in this way that the grating 14 remains securely in contact with the guide rails 18 and remains in the provided movement range. As can be seen in particular in FIG. 1, the rearing planes 6, 8 each have at least one, in particular two lateral openings 37*a*, 37*b* on a second side 36 lying opposite the first side 10. The holding facility 2 has at least one, in particular two second door arrangements 38 with a closing means 39, wherein the closing means 39 is received in a vertically displaceable manner with respect to the two openings 37*a*, 37*b* and is configured for releasing or for closing the first, lower opening 37*a*, the second, upper opening 37*b* and the two openings 37*a*, 37*b*. In the exemplary embodiment shown in the Figures, two lateral openings 11*a* are in each case provided in the first rearing plane 6 and two lateral openings 11*b* in the second rearing plane 8 per side 10, 36. A door arrangement 12 is thereby assigned to the respective adjacent lateral openings 11*a*, 11*b*. This applies analogously on the second side 36. A second door arrangement is also in each case assigned here to the adjacent lateral openings 37*a*, 37*b*. The horizontal guide rail sections 22 of the door arrangement 12 and of the second door arrangement 38 run in particular parallel to one another and on top of one another, as clearly illustrated in FIG. 1. The gratings 14 or closing means 13, respectively, can also be moved parallel to one another into a rest position, as illustrated in FIG. 1, in a region above the second rearing plane 8.

In the operating state shown in FIG. 1, in the case of which the gratings 14 are opened completely and are arranged in an upper, horizontal region of the horizontal guide rail sections 22, vaccinating personnel can catch and vaccinate the animals, which are received in the rearing-keeping facility 2, particularly well. Hardly any barriers are furthermore erected for the personnel by means of the door arrangement 12. In the closed state of the door arrangements 12 shown in FIG. 3, it is prevented that the animals reach onto a floor below the rearing-keeping facility 2. In the state shown in FIG. 6, in the case of which the grating 14 or the closing means 13 is partly in the vertical guide rail section 20, the horizontal guide rail section 22 and the curved guide rail section 24, the first rearing plane 6 is released and the upper rearing plane is closed.

It is prevented thereby that animals, which are located in the region of the upper second rearing plane 8, can jump down onto a floor below the rearing-keeping facility 2 and it can furthermore be ensured that the animals can initially be caught in the first rearing plane 6, which can be accessed from the outside, before, for example, the animals can also be caught in the second rearing plane 8. In the operating state shown in FIG. 7, the grating 14 was divided into grating sections 27, which, in turn, each consist of several grating segments 26. The lower first rearing plane 6 is closed in this way and the second rearing plane 8 is released. The grating section 27, which is not required, can furthermore be moved in the region of the horizontal guide rail section 22 and does not have an interfering effect on the accessibility of the rearing-keeping facility 2 in this respect.

The invention claimed is:

1. A rearing-keeping facility for the staggered rearing of poultry animals comprising:
   a first rearing plane and a second rearing plane arranged above the first rearing plane, wherein the first and second rearing planes are configured for keeping the poultry animals, and wherein the first rearing plane has a first lateral opening towards at least one side of the rearing-keeping facility and the second rearing plane has a second lateral opening towards the one side; and
   a door arrangement for closing the openings, wherein the door arrangement has a closure, which is arranged in a vertically displaceable manner with respect to the two openings and which is configured for releasing and for closing the first opening, the second opening, and both the first opening and the second opening.

2. The keeping facility according to claim 1, wherein the door arrangement further comprises a guide arrangement for guiding the closure and wherein the guide arrangement is arranged on a base frame of the keeping facility.

3. The keeping facility according to claim 2, wherein the guide arrangement has oppositely arranged guide rails on which the closure is guided in a displaceable manner, and wherein, adjacent to the lateral openings, the guide rails have an essentially vertical guide rail section configured for guiding the closure for closing and releasing the lateral openings.

4. The keeping facility according to claim 3, wherein the oppositely arranged guide rails have, on a top side of the base frame, an essentially horizontal guide rail section dimensioned so that the closure can be received completely in the essentially horizontal guide rail section.

5. The keeping facility according to claim 4, wherein the guide rails, between the essentially vertical guide rail section and the essentially horizontal guide rail section, have a curved guide rail section that connects the essentially vertical guide rail section to the essentially horizontal guide rail section.

6. The keeping facility according to claim 5, wherein a stop, which delimits a movement range of the closure in the essentially vertical guide rail section and/or the essentially horizontal guide rail section, is assigned to the guide rails.

7. The keeping facility according to claim 1, wherein the closure comprises a grating.

8. The keeping facility according to claim 7, wherein the grating is formed from at least two grating segments, and wherein the at least two grating segments are connected by a connector and can be moved relative to one another.

9. The keeping facility according to claim 8, wherein the at least two grating segments can be pivoted relative to one another.

10. The keeping facility according to claim 8, wherein the connector is configured for reversibly connecting the grating segments.

11. The keeping facility according to claim 10, wherein the connector comprises a latching mechanism adapted for releasing a connection between the grating segments.

12. The keeping facility according to claim 8, further comprising at least two laterally opposite guides upon and by which the at least two grating segments are guided.

13. The keeping facility according to claim 12, wherein the connector for two adjacent grating segments are formed on the guides assigned to each grating segment.

14. The keeping facility according to claim 1, wherein the first rearing plane and the second rearing plane each have a lateral opening towards at least one second side opposed to the one side, wherein the keeping facility has a second door arrangement with a second closure received in a vertically displaceable manner with respect to the lateral openings on the second side and which is adapted for releasing or for closing the first rearing plane second side opening, the second rearing plane second side opening, and both the first rearing plane second side opening and the second rearing plane second side opening.

15. A method for the configuration of a keeping facility according to claim 1, with at least one of the steps of:

positioning a grating so that the first and second lateral openings are open;

positioning the grating so that the first lateral opening of the first rearing plane is closed and the second lateral opening of the second rearing plane is open;

positioning the grating so that both the first lateral opening of the first rearing plane and of the second lateral opening of the second rearing plane are closed; and dividing the grating into grating sections and moving the grating sections of the grating so that the second lateral opening of the second rearing plane is closed and the first lateral opening of the first rearing plane is open.

16. A poultry animal house for rearing poultry animals comprising a rearing-keeping facility according to claim 1.

17. Use of a rearing-keeping facility for rearing pullets in a poultry animal house according to claim 16.

18. Use of a rearing-keeping facility according to claim 1 for rearing poultry animals in a poultry animal house.

19. A rearing-keeping facility for the staggered rearing of poultry animals comprising:

a first rearing plane and a second rearing plane arranged above the first rearing plane, wherein the first and second rearing planes are configured for keeping the poultry animals, and wherein the first rearing plane has a first lateral opening towards at least one side of the rearing-keeping facility and the second rearing plane has a second lateral opening towards the at least one side; and a door arrangement for closing the openings, wherein the door arrangement comprises a grating arranged in a vertically displaceable manner with respect to the first and second openings and configured for opening or for closing the first opening, the second opening, and both the first opening and the second opening.

20. A rearing-keeping facility for the staggered rearing of poultry animals comprising:

a first rearing plane and a second rearing plane arranged above the first rearing plane, wherein the first and second rearing planes are configured for keeping the poultry animals, and wherein the first rearing plane has a first lateral opening towards at least one side of the rearing-keeping facility and the second rearing plane has a second lateral opening towards the one side; and a door arrangement for selectively closing the openings, wherein the door arrangement comprises:

a pair of oppositely arranged guide rails each having an essentially horizontal guide rail section on a top side of a base frame of the keeping facility dimensioned so that a door arrangement closure can be received completely in the essentially horizontal guide rail section, an essentially vertical guide rail section, and a curved guide rail section connecting the essentially vertical guide rail section to the essentially horizontal guide rail section; and the closure comprising a grating arranged in a vertically displaceable manner with respect to the first lateral opening and the second lateral opening and configured for opening and for closing the first opening, the second opening, and both the first opening and the second opening.

\* \* \* \* \*